(12) United States Patent
Tentorio

(10) Patent No.: US 8,429,892 B2
(45) Date of Patent: Apr. 30, 2013

(54) COMBUSTION APPARATUS HAVING A FUEL CONTROLLED VALVE THAT TEMPORARILY FLOWS PURGING AIR

(75) Inventor: Luca Tentorio, Derby (GB)

(73) Assignee: Rolls-Royce PLC (GB)

( * ) Notice: Subject to any disclaimer, the term of this patent is extended or adjusted under 35 U.S.C. 154(b) by 898 days.

(21) Appl. No.: 12/476,857

(22) Filed: Jun. 2, 2009

(65) Prior Publication Data
US 2009/0293492 A1    Dec. 3, 2009

(30) Foreign Application Priority Data
Jun. 2, 2008 (GB) .................................. 0809901.2

(51) Int. Cl.
*F02G 3/00*        (2006.01)
*F02G 1/00*        (2006.01)

(52) U.S. Cl.
USPC .......... 60/39.094; 60/39.79; 60/39.8; 60/734; 137/112; 137/115.13; 137/625.4; 137/625.11

(58) Field of Classification Search ............... 60/39.094, 60/39.79, 39.8, 734, 741, 742; 137/112, 137/115.13, 115.14, 115.15, 240, 625.4, 137/625.11, 625.48, 627.5
See application file for complete search history.

(56) References Cited

U.S. PATENT DOCUMENTS

| | | | |
|---|---|---|---|
| 1,451,887 A | 4/1923 | Novak | |
| 2,011,329 A * | 8/1935 | Wayer | 137/625.13 |
| 2,617,255 A | 11/1952 | Niehus | |
| 2,858,851 A * | 11/1958 | Holl | 137/625.18 |
| 2,916,878 A | 12/1959 | Wirt | |
| 2,933,895 A | 4/1960 | Cheeseman | |
| 3,011,507 A * | 12/1961 | Hansen | 137/115.14 |
| 3,295,280 A | 1/1967 | Kettner | |
| 3,429,683 A * | 2/1969 | Jehn | 65/301 |
| 3,533,430 A * | 10/1970 | Fredd | 137/112 |
| 3,678,959 A * | 7/1972 | Liposky | 137/625.11 |
| 3,774,638 A * | 11/1973 | Kriett | 137/625.48 |
| 4,030,875 A | 6/1977 | Grondahl et al. | |
| 4,095,418 A * | 6/1978 | Mansson et al. | 60/39.094 |
| 4,203,458 A * | 5/1980 | Barrett et al. | 137/38 |
| 4,284,103 A * | 8/1981 | Pemberton | 137/625 |
| 4,315,405 A | 2/1982 | Pidcock et al. | |
| 4,343,601 A * | 8/1982 | Thorson | 418/61.3 |
| 4,454,892 A * | 6/1984 | Chadshay | 137/597 |
| 4,628,694 A | 12/1986 | Kelm et al. | |

(Continued)

FOREIGN PATENT DOCUMENTS

DE    10136196 A1    2/2003
EP    1734136        12/2006

(Continued)

*Primary Examiner* — William H Rodriguez
*Assistant Examiner* — Michael B Mantyla
(74) *Attorney, Agent, or Firm* — McCormick, Paulding & Huber LLP

(57) ABSTRACT

A fuel valve for a turbine engine, the valve has a fuel inlet connected to a supply of fuel and a purge inlet connected to a supply of purge air. Opening and closing apparatus within the valve selectively supplies air or fuel to a valve outlet. The opening and closing apparatus are movable in sequence from a first position where both the purge air and fuel to the outlet is disabled to a second position where the purge air is enabled and the fuel is disabled to a third position where the purge air is disabled and the fuel is enabled.

4 Claims, 4 Drawing Sheets

U.S. PATENT DOCUMENTS

| | | | |
|---|---|---|---|
| 4,652,476 A | 3/1987 | Kromrey | |
| 4,793,591 A * | 12/1988 | Decker et al. | 251/172 |
| 5,000,005 A | 3/1991 | Kwan et al. | |
| 5,046,702 A * | 9/1991 | Miyazawa et al. | 251/129.04 |
| 5,050,385 A | 9/1991 | Hirose et al. | |
| 5,137,586 A | 8/1992 | Klink | |
| 5,285,809 A * | 2/1994 | Shimoguri | 137/203 |
| 5,331,816 A | 7/1994 | Able et al. | |
| 5,341,769 A | 8/1994 | Ueno et al. | |
| 5,405,261 A | 4/1995 | Scraggs et al. | |
| 5,449,422 A | 9/1995 | Pflanz et al. | |
| 5,553,455 A | 9/1996 | Craig et al. | |
| 5,577,379 A | 11/1996 | Johnson | |
| 5,701,732 A * | 12/1997 | Nesbitt et al. | 60/776 |
| 5,709,919 A | 1/1998 | Kranzmann et al. | |
| 5,782,294 A | 7/1998 | Froemming et al. | |
| 5,799,491 A | 9/1998 | Bell et al. | |
| 5,957,067 A | 9/1999 | Dobbeling et al. | |
| 6,050,081 A * | 4/2000 | Jansen et al. | 60/39.094 |
| 6,174,389 B1 | 1/2001 | Mann | |
| 6,182,442 B1 | 2/2001 | Schmidt et al. | |
| 6,199,371 B1 | 3/2001 | Brewer et al. | |
| 6,351,949 B1 | 3/2002 | Rice et al. | |
| 6,438,963 B1 * | 8/2002 | Traver et al. | 60/779 |
| 6,470,685 B2 | 10/2002 | Pidcock et al. | |
| 6,770,325 B2 | 8/2004 | Troczynski et al. | |
| 6,901,757 B2 | 6/2005 | Gerendas | |
| 6,931,831 B2 | 8/2005 | Jansen | |
| 7,024,862 B2 | 4/2006 | Miyake et al. | |
| 7,281,529 B2 * | 10/2007 | Lew et al. | 123/568.12 |
| 7,658,201 B2 * | 2/2010 | Salomon | 137/240 |
| 2002/0026784 A1 * | 3/2002 | Nakamoto | 60/39.094 |
| 2002/0184892 A1 | 12/2002 | Calvez et al. | |
| 2003/0056516 A1 | 3/2003 | Hadder | |
| 2003/0079475 A1 | 5/2003 | Schmahl et al. | |
| 2004/0110041 A1 | 6/2004 | Merrill et al. | |
| 2004/0118127 A1 | 6/2004 | Mitchell et al. | |
| 2005/0034399 A1 | 2/2005 | Pidcock et al. | |
| 2005/0238859 A1 | 10/2005 | Uchimaru et al. | |
| 2006/0070655 A1 * | 4/2006 | Tebby | 137/112 |
| 2006/0242914 A1 | 11/2006 | Stephansky et al. | |
| 2007/0028592 A1 | 2/2007 | Grote et al. | |
| 2007/0028620 A1 | 2/2007 | McMasters et al. | |
| 2007/0107710 A1 | 5/2007 | DeSousa et al. | |
| 2007/0234730 A1 | 10/2007 | Markham et al. | |
| 2007/0246149 A1 | 10/2007 | Millard et al. | |
| 2007/0289307 A1 | 12/2007 | Grote et al. | |
| 2008/0099465 A1 | 5/2008 | Myers et al. | |

FOREIGN PATENT DOCUMENTS

| | | |
|---|---|---|
| EP | 1734136 A2 | 12/2006 |
| EP | 1741891 A1 | 1/2007 |
| GB | 1503921 | 3/1978 |
| GB | 2148949 A | 10/1984 |
| GB | 2353589 A | 2/2001 |
| GB | 2361304 A | 10/2001 |
| JP | 8021687 A | 7/1994 |

* cited by examiner

COMBUSTION APPARATUS HAVING A FUEL CONTROLLED VALVE THAT TEMPORARILY FLOWS PURGING AIR

CROSS REFERENCE TO RELATED APPLICATION

This application is entitled to the benefit of British Patent Application No. GB 0809901.2, filed on Jun. 2, 2008.

FIELD OF THE INVENTION

This invention relates to fuel supply valves for turbine engines.

BACKGROUND OF THE INVENTION

With reference to FIG. 1, a ducted fan gas turbine engine generally indicated at 10 includes, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the airflow directed into it before delivering the air to the high-pressure compressor 4 where further compression takes place.

Compressed air exhausted from the high-pressure compressor 4 is directed into the combustion equipment 5, where it is mixed with fuel and the mixture combusted. The resultant hot combustion products expand through and thereby drive the high 6, intermediate 7 and low-pressure 8 turbines before being exhausted through the nozzle 9 to provide additional propulsive thrust. The high, intermediate and low-pressure turbines respectively drive the high and intermediate pressure compressors and the fan by suitable interconnecting shafts.

Modern fuel injectors 18 now commonly include an injector head 22 mounted on a stalk 20. The head 22 has a set of pilot nozzles adapted to eject fuel at a low power requirement and a set of main nozzles adapted to eject fuel into the combustor at cruise and at higher power levels. Typically the pilot nozzles also supply fuel to the combustor at high power requirements. The use of two sets of nozzles provides a highly efficient injector with acceptable emissions.

Fuel is supplied to both sets of nozzles through tubes running the length of the injector stalk. A check valve is located at the end of the stalk opposing the head end. The check valves hold fuel in their upstream manifolds in order to avoid having to prime the manifolds following a demand from the engine controller for more power.

One of the problems with having stagnant fuel in the injector fuel galleries is that at operational temperatures of the engine the fuel can undergo thermal breakdown leading to deposition of carbon in the manifolds in a process known as coking. Heavy coking can block the fuel passages causing, ultimately, failure of the injector amongst other problems.

The fuel upstream of the valve is located in a position cool enough not to suffer from coking and the flow of the pilot fuel is sufficient to keep the temperature of the stagnant fuel below the coking temperature. Downstream of the valve the temperature is high enough for the fuel to coke and it is desirable to purge the galleries and conduits downstream of the valve to remove stagnant fuel.

In U.S. Pat. No. 5,243,816 a valve is provided and is opened and closed by the pressure difference between the fuel supply and the pressure of air coming from the compressor and upstream of the injector. A spring is used to bias the valve into the fuel off position. As will be appreciated from this document whenever the fuel is not flowing into the injector head the purge air is continually flowing through the injector. This arrangement is acceptable in an injector having just one set of nozzles e.g. pilot or main, but in an injector having both sets the continual flow of hotter air through the galleries will increase the temperature of fuel flowing (sometimes slowly) in adjacent galleries above its coking temperature and heat-shields which are provided to avoid this situation are bypassed.

SUMMARY OF THE INVENTION

It is an object of the present invention to seek to provide an improved fuel valve and injector that addresses these and other problems.

According to a first aspect of the invention there is provided a fuel valve for a turbine engine, the valve having a fuel inlet and an outlet the fuel inlet being suitable for connecting to a supply of fuel, the valve having a purge inlet suitable for connecting to a supply of purge air, the valve having an opening and closing means which enables or disables the supply of fuel and purge air from their respective inlets to the outlet, the opening and closing means being movable in sequence from a first position where both the purge air and fuel to the outlet is disabled to a second position where the purge air is enabled and the fuel is disabled to a third position where the purge air is disabled and the fuel is enabled.

Preferably the opening and closing means includes a spool moveable within valve.

The spool may have at least one aperture that in turn aligns with the purge inlet and fuel inlet as the spool moves within the valve.

Preferably the spool is moveable in a linear translation. As an alternative or in combination the spool may rotate within the valve to align aperture(s) with the fuel and purge inlets.

Preferably the supply of fuel exerts a pressure on the spool wherein the spool is moveable by a pressure difference between the pressure in the fuel inlet and the pressure in the outlet.

A spring is located to bias against the opening means. Any appropriate spring means may be used for the spring.

According to a second aspect of the invention there is provided a of staging a fuel valve, the method having the steps of sequentially opening a flow of purge air to the injector, closing the flow of purge air to the injector, opening a flow of fuel to the injector for injection from the injector into a combustion chamber, closing the flow of fuel to the injector, opening a flow of purge air to the injector, closing the flow of purge air to the injector.

DETAILED DESCRIPTION OF THE PREFERRED EMBODIMENTS

Figure 1:
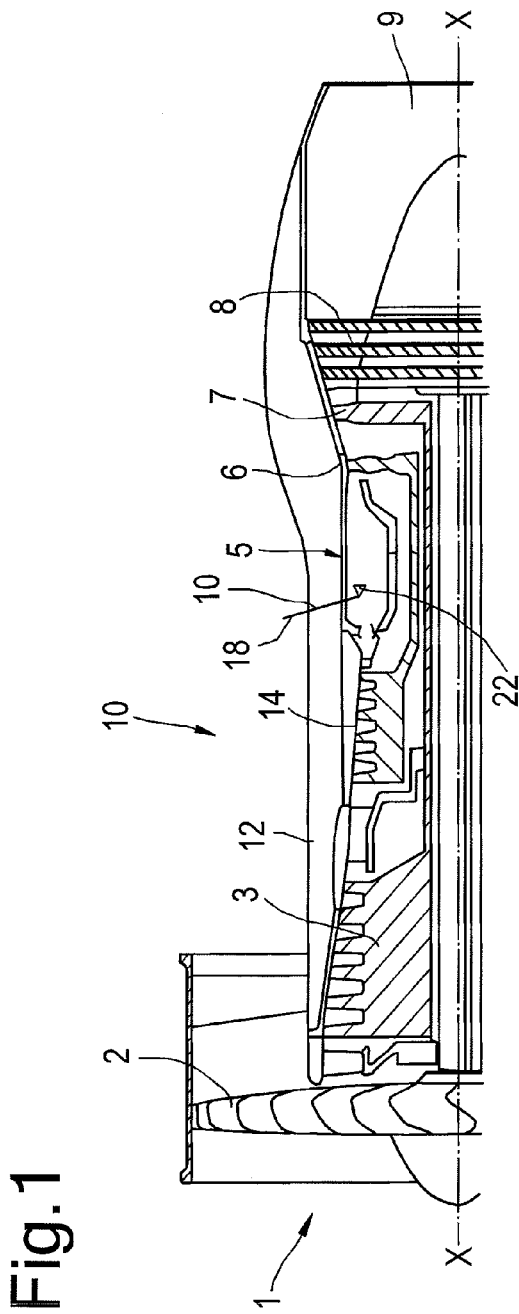
FIG. 1 is a simplified drawing of a ducted fan gas turbine engine.
Figure 2:
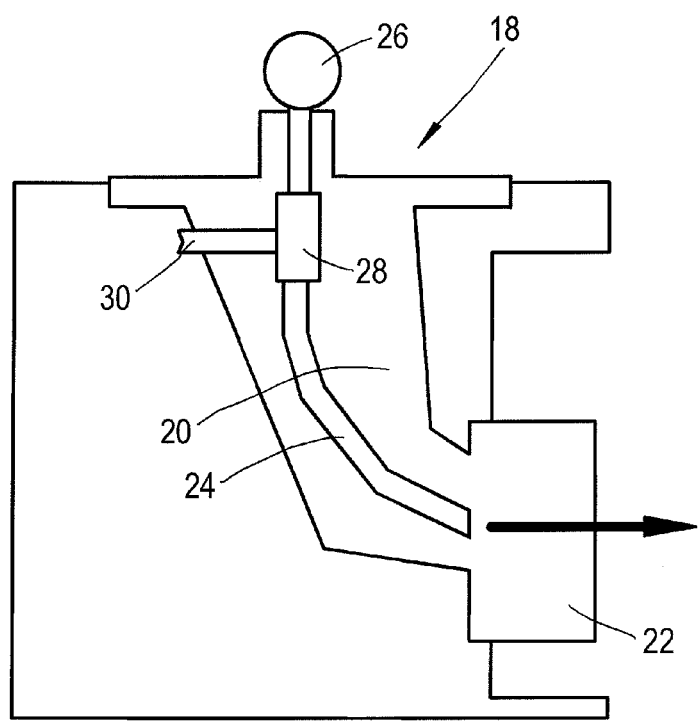
FIG. 2 depicts a fuel injector stalk and head.

Referring to FIG. 2 the fuel injector 18 includes a head 22 and a stalk 20. A passage 24 inside the stalk 20 connects nozzles (not shown) in the head with a fuel manifold 26. A fuel supply valve 28 in the stalk controls the supply and ejection of fuel to the nozzles for ejection into the combustion chamber 5. A port 30 supplies pressurised air to the valve, which controls when the air is used to purge the injector galleries.

The pressurised air flowing to the injector at operating conditions has a pressure of around 17 bar (260 psi) and a temperature of the order 720K. The air pressure in the combustor and just downstream of the valve is about 95% that of the air inlet pressure to the valve i.e. of the order 16.1 bar. It will be appreciated that these conditions are exemplary and particular injectors and engines will have different pressure and temperature values.

Figure 3:
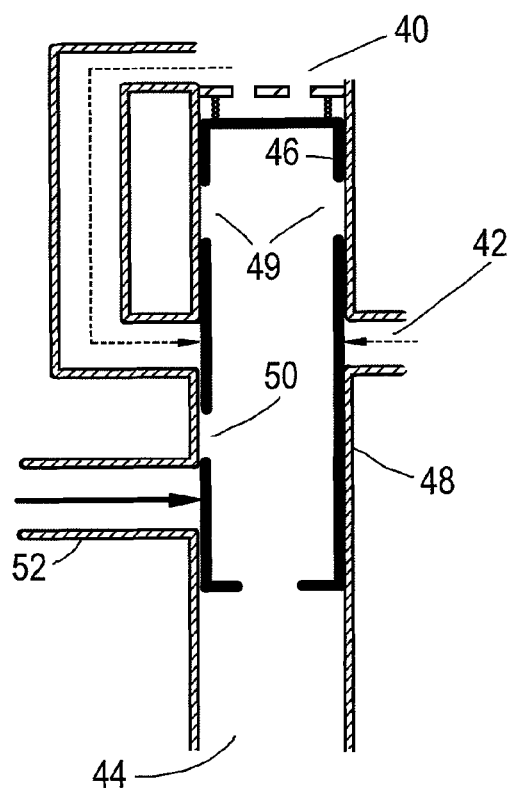
FIG. 3 is a schematic of a valve closed to both air and fuel flow.

FIG. 3 depicts a control valve according to the invention for the mains fuel supply circuit. The valve has a fuel inlet connected to a fuel manifold 26 (FIG. 2). The valve has a further fuel inlet 42, which helps to increase the refill time and the speed of response when the valve is opened to supply fuel. The fuel inlet has a pressure $P_{manifold}$ which in the closed position of the valve is less than the air pressure at the outlet of the valve 44, which is at a pressure close to that of the injector head outlet $P_{outlet}$. There is typically a 5% drop in air pressure across the injector.

A spool 46 is mounted within the sleeve 48 of the valve and is movable linearly within the sleeve. The primary driver of the spool is the pressure difference between the fuel pressure in the manifold $P_{manifold}$ and the pressure at the outlet $P_{outlet}$. If desired a biasing spring 40 may be provided which biases the spool in a closed or open position.

The spool has a plurality of apertures 49, 50 that in the closed position do not match up with the fuel inlets 42 or the purge air inlet 52. In the closed position there is no fuel or air flow through the nozzle fuel gallery 44 valve outlet.

The closed position of the valve is of primary use where the engine is at low power requirements and fuel is injected into the combustor through the pilot circuit. A stop is provided to prevent the valve sliding further than desired.

When a demand for greater thrust is sent by the pilot to the engine controller, the controller causes an increase in the fuel pressure and the pressure $P_{manifold}$. Once $P_{manifold}$ is greater than $P_{outlet}$ the valve spool 46 begins to move within the sleeve 48. In a transitional phase, shown in FIG. 4, the aperture 50 in the spool moves over the purge air inlet 52 allowing purge air to flow through the valve to the valve outlet 44. The apertures 49, which align with, the fuel supply ports 42 are, in this transitional state, not aligned and fuel supply to the outlet is not enabled.

The purge air flows through the valve driven by the pressure difference $P_{air}-P_{outlet}$. With an aperture 50 having a diameter of 3 mm and a pressure drop of 5.5 bar the aperture remains open for approximately 0.5 seconds and permits a total flow of around 0.2 litres to flow through the valve body.

Figure 4:
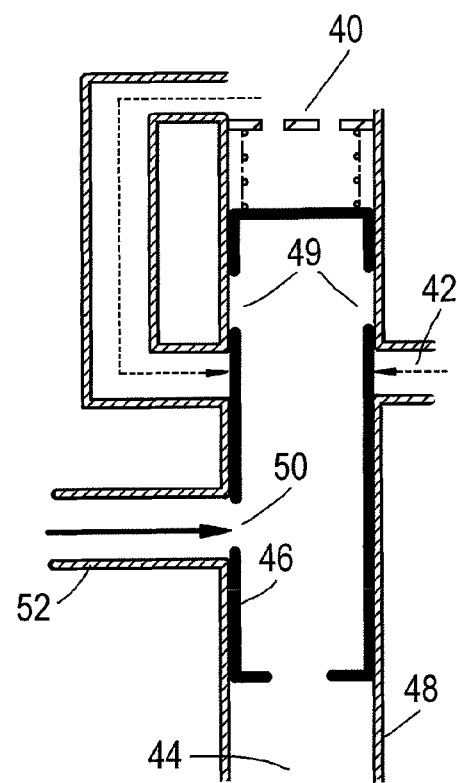
FIG. 4 is a schematic of the valve of FIG. 3 opening where the valve is open to purge air but closed to fuel flow.
Figure 5:
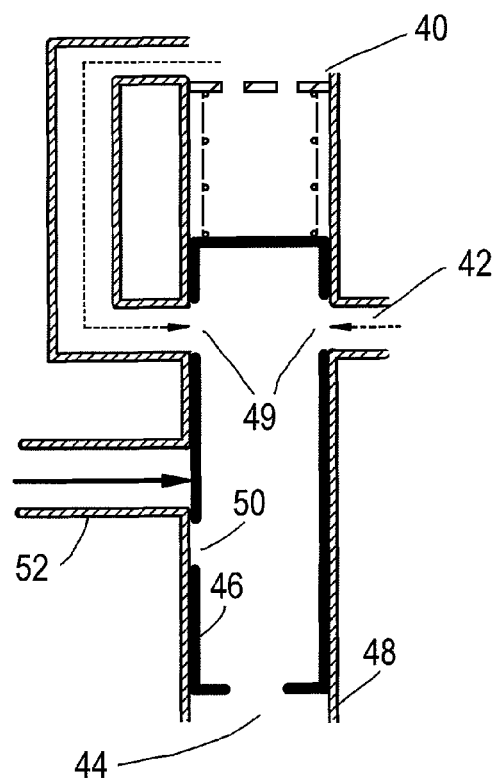
FIG. 5 is a schematic of the valve of FIGS. 3 and 4 opened where the valve is closed to purge air but open to fuel flow.

As the state depicted in FIG. 4 is transitional the spool continues to be driven by the pressure difference $P_{manifold}-P_{outlet}$ till it reaches its final position depicted in FIG. 5. The spool is prevented from travelling further than required by the provision of a stop (not shown). The apertures 49 align with the fuel supply inlets 42 to enable the flow of fuel through the valve to the injector nozzles. In this position the purge air is disabled as the apertures 50 are beyond the air purge supply.

Figure 6:
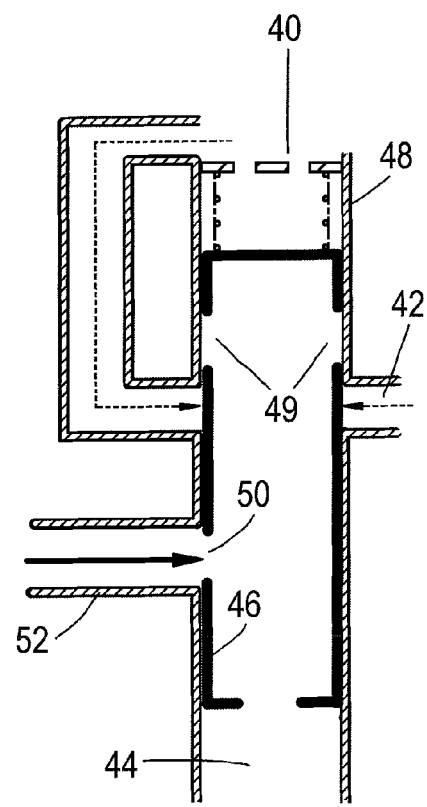
FIG. 6 is a schematic of the valve closing where the valve is open to purge air but closed to fuel flow.

The valve remains in this position whilst the engine controller is demanding the higher level of power. When it is no longer required to provide this higher level of power the fuel pressure manifold $P_{manifold}$ is reduced. When this falls below the pressure at the injector head the pressure difference causes the spool to move upwards within the sleeve through the transitional position depicted in FIG. 6.

Once again, for a short period, the apertures 50 aligns with the purge air supply allowing a flow of purge air to pass through the valve to the valve outlet. The closing speed is slower than the opening speed such that the flow of purge air is enabled for approximately 6.5 seconds. In this time about 0.7 litres of air pass through the purge valve. Considering that the fuel galleries downstream of the valve have a volume of the order 10 cc (0.01 lt) the flow of purge air is sufficient to purge the galleries of any stagnant fuel.

It will be appreciated that the present valve has the advantage of being simple and compact. A single valve integrates the functionality of a purge system that permits the fuel manifolds to remain primed yet permits purging to occur every time the main nozzles are staged in or out. Beneficially the valve prevents a continual flow of purge air when the main injector is not injecting fuel into the combustor cavity and thereby helps to reduce coking of the pilot manifolds and their other features.

The valve may also be modified to allow other volumes of purge air to be used depending on the application. Such a modification may be by, for example, changing the strength of the spring, altering the port locations and sizes. Some of these modifications can also be used to change the time period for which the purge air is supplied.

In a less elegant modification the method of the invention may be achieved using a fuel check valve and an air check valve feeding into a common body, which feeds the fuel injector nozzle. The air valve is operated to open and close to supply air through the common body before the fuel valve is opened and again following closure of the fuel valve. The valves need to be appropriately synchronised to avoid both the fuel and air valves being open simultaneously.

Whilst the invention has been described with respect to use of the valve and method in turbine engines it will be appreciated that the skilled person will be able to modify the invention for use in other industries, for example, but not exclusively, the automotive industry.

Where the engine is a piston engines, the valve permits the introduction of air followed by fuel at an appropriate time delay as determined by the speed of movement of the valve spool and the distance between the fuel and air inlet spacing.

What is claimed is:

1. A fuel valve for a turbine engine, the fuel valve comprising:
    a housing comprising:
    a cavity formed by an upstream end, a downstream end, and sidewalls connecting the upstream and downstream ends;
    an upstream end inlet;
    a downstream end outlet;
    a fuel inlet located on at least one of the sidewalls and suitable for connecting to a supply of fuel,
    a purge inlet located on at least one of the sidewalls and suitable for connecting to a supply of purge air,
    a hollow spool disposed within the cavity and movable via a fuel pressure from the upstream end inlet,
    the hollow spool comprising: a solid wall facing the upstream end inlet, a first inlet lateral aperture, a second inlet lateral aperture, and an outlet aperture on a wall facing the downstream end outlet which enables or disables the supply of fuel and purge air from the fuel and purge air inlets to the downstream end outlet, the hollow spool being movable in sequence from a first position where both the first and second inlet lateral apertures are not aligned with the purge air and fuel inlets to a second position where the first inlet lateral aperture is aligned with the purge air inlet and the second lateral inlet aperture is not aligned with the fuel inlet to a third position where the first inlet lateral aperture is not aligned with the purge air inlet and the second inlet lateral aperture is aligned with the fuel inlet.

2. A fuel valve according to claim 1, wherein the spool is moveable in a linear translation.

3. A fuel valve according to claim 1, wherein the supply of fuel exerts a pressure on the spool wherein the spool is moveable by a pressure difference between the pressure in the fuel inlet and the pressure in the outlet.

4. A fuel valve according to claim 3, wherein a spring is located to bias against the opening means.

\* \* \* \* \*